(12) United States Patent
Beer et al.

(10) Patent No.: US 9,340,369 B2
(45) Date of Patent: May 17, 2016

(54) DEVICE AND METHOD FOR HORIZONTAL MOVEMENT OF LAYERS OF ARTICLES BETWEEN ADJACENT CONVEYOR MODULES

(71) Applicant: Krones AG, Neutraubling (DE)

(72) Inventors: Erhard Beer, Ebbs (AT); Martin Osterhammer, Frasdorf (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/484,429

(22) Filed: Sep. 12, 2014

(65) Prior Publication Data
US 2015/0075948 A1   Mar. 19, 2015

(30) Foreign Application Priority Data
Sep. 13, 2013 (DE) .......................... 10 2013 218 442

(51) Int. Cl.
*B65G 47/52* (2006.01)
*B65G 57/06* (2006.01)
(Continued)

(52) U.S. Cl.
CPC .............. *B65G 47/52* (2013.01); *B65G 47/845* (2013.01); *B65G 57/06* (2013.01); *B65G 57/24* (2013.01)

(58) Field of Classification Search
None
See application file for complete search history.

(56) References Cited

U.S. PATENT DOCUMENTS 5,129,162 A      7/1992   Hemmersbach et al.
5,163,808 A *  11/1992   Tsubone ................ B65G 57/26
                                                            414/791.8

(Continued)

FOREIGN PATENT DOCUMENTS

CN   1256238 A    6/2000
CN   1539562 A   10/2004
(Continued)

OTHER PUBLICATIONS

German Search Report for DE 10 2013 218 442.5 dated Mar. 25, 2014.
(Continued)

*Primary Examiner* — Kavel Singh
(74) *Attorney, Agent, or Firm* — Dennemeyer & Associates, LLC.

(57) ABSTRACT

This invention concerns a method for horizontal movement of groups or layers of articles (10) between adjacent conveyor modules (12, 16, 34). The groups or layers of articles (10) are moved from a vertically movable first support level (28) of a first conveyor module (16) to a vertically movable second support level (38) of a second conveyor module (34) immediately downstream of the first conveyor module (16) in the direction of transport or transfer (30) by means of at least one frame-like transfer device (22, 40), which is lowered over the layer or group of articles (10) to be transported and encompasses them on all sides, and moves in the direction of transport or transfer (30) from the first conveyor module (16) to the second conveyor module (34) during the movement of a group or layer of articles (10) At least during the transfer movement, the support layers (28, 38) of the first and second conveyor modules (16, 34) form a common transfer surface at approximately the same height or moving vertically in the same direction. This invention further concerns a suitable device for handling and/or stacking and/or palletizing groups or layers of articles (10). The device comprises a vertically movable first conveyor module (16) with a first support level (28) and a second conveyor module (34) with a second support level (38) immediately downstream of the first conveyor module (16) in the direction of transport or transfer (30), as well as at least one vertically movable frame-like transfer device (22, 40) for pushing a group or layer of articles (10) from the first conveyor module (16) to the second conveyor module (34). The transfer device encompasses the group or layer of articles (10) on all sides, whereby the support layers (28, 38) of the first and second conveyor modules (16, 34) form a common, vertically moving transfer surface at approximately the same height or moving vertically in the same direction during the transfer (30).

13 Claims, 11 Drawing Sheets

(51) Int. Cl.
  *B65G 57/24* (2006.01)
  *B65G 57/26* (2006.01)
  *B65G 47/84* (2006.01)

(56) References Cited

U.S. PATENT DOCUMENTS

| | | | |
|---|---|---|---|
| 6,059,519 A | 5/2000 | Dutto et al. | |
| 6,557,724 B1 * | 5/2003 | LeCroy | B65G 47/647 198/435 |
| 2003/0232103 A1 * | 12/2003 | Marino | A21C 11/006 425/371 |

FOREIGN PATENT DOCUMENTS

| | | |
|---|---|---|
| DE | 27 43 398 C2 | 5/1983 |
| DE | 10 2008 015 278 A1 | 10/2009 |
| EP | 0 391 208 A1 | 10/1990 |
| EP | 1 321 396 A1 | 6/2003 |
| EP | 1 908 709 A1 | 4/2008 |
| JP | H07-304 513 A | 11/1995 |
| NL | 8801528 | 1/1990 |
| WO | 2013/038102 A1 | 3/2013 |

OTHER PUBLICATIONS

European Search Report for EP 14 18 0404 dated Feb. 11, 2015.
Chinese Office action for CN 104512712 A dated Mar. 2, 2016.

* cited by examiner

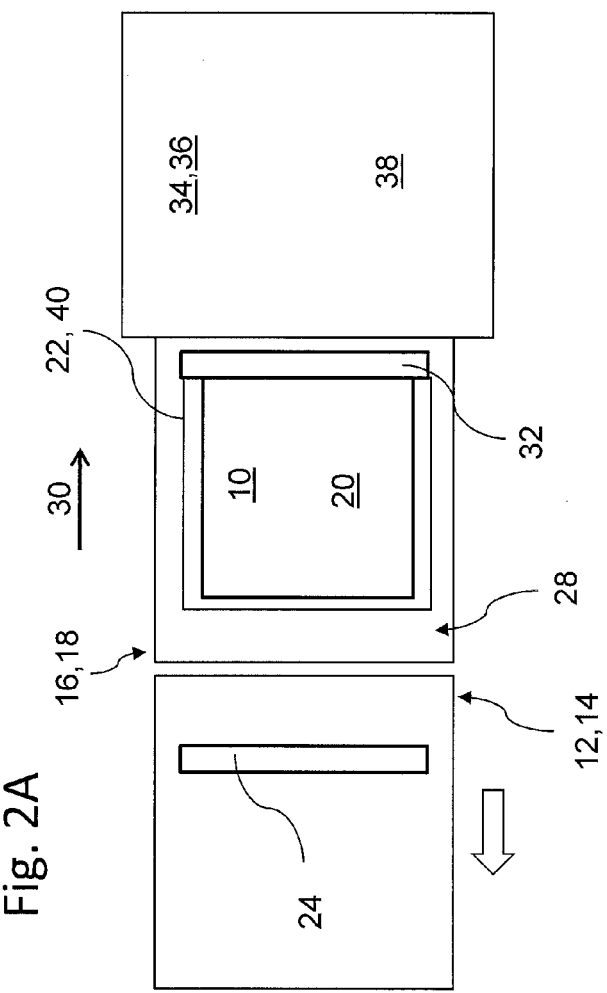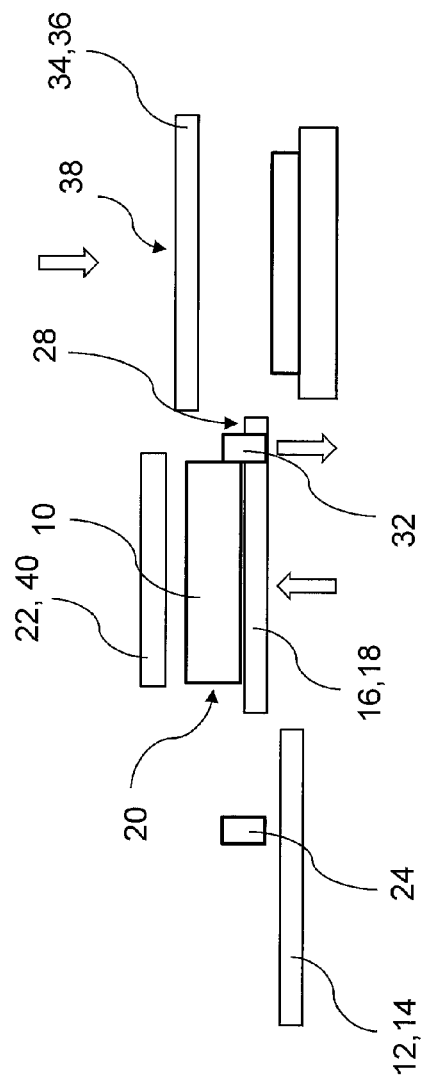

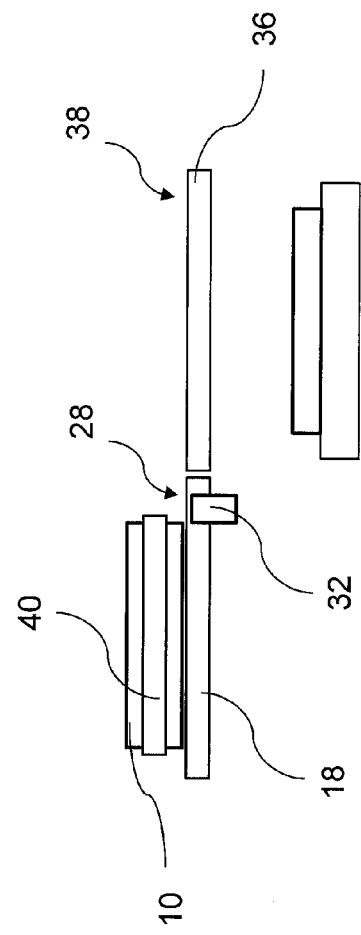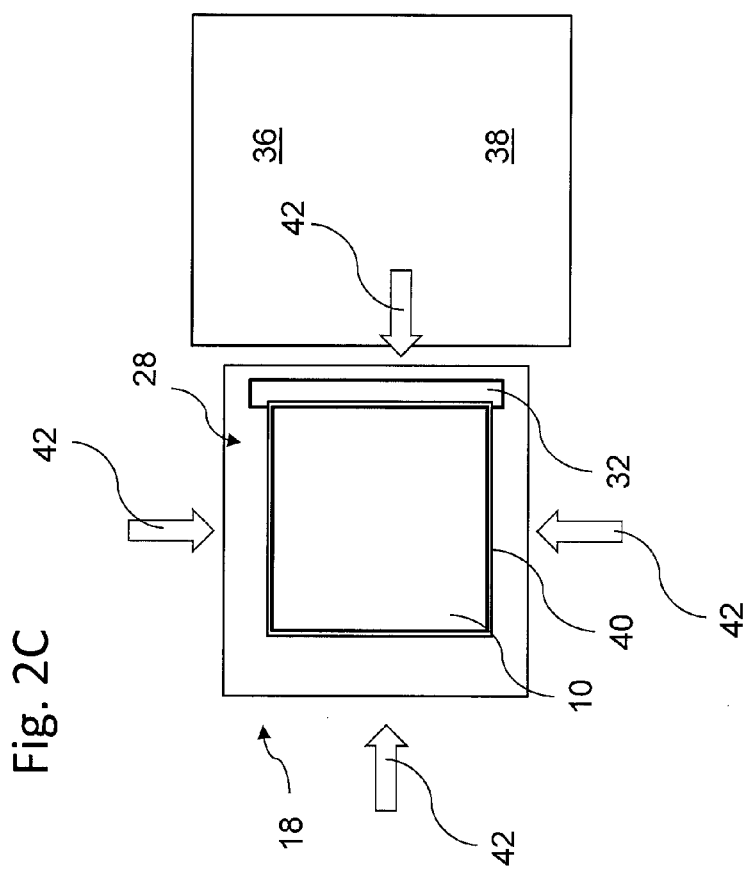

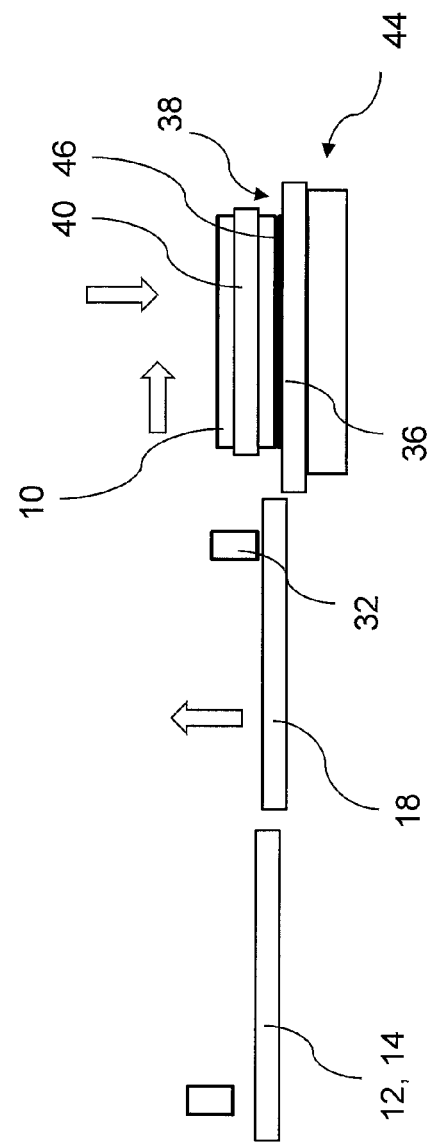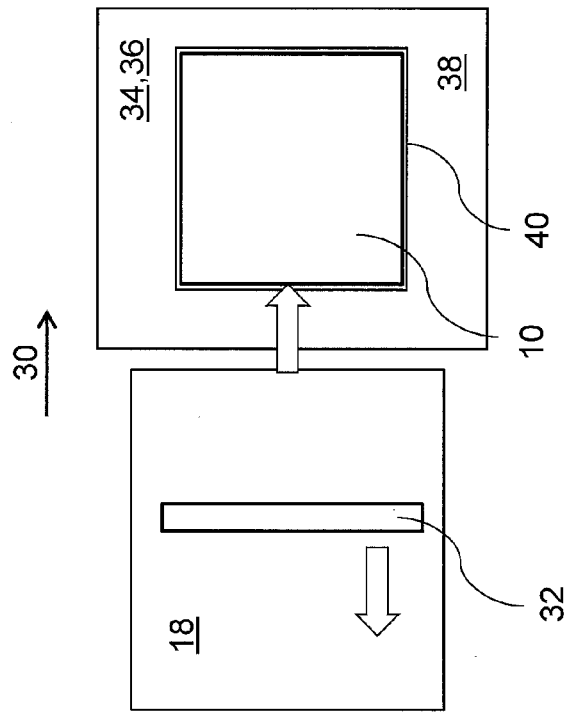

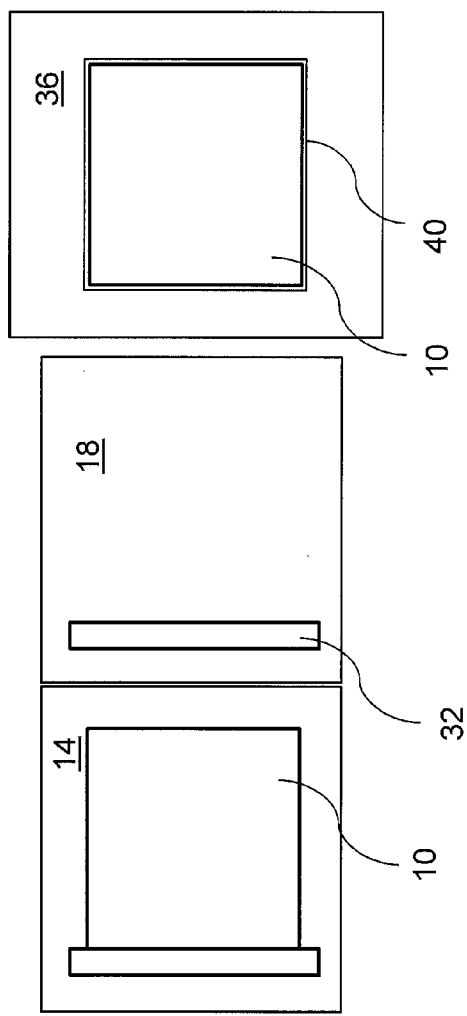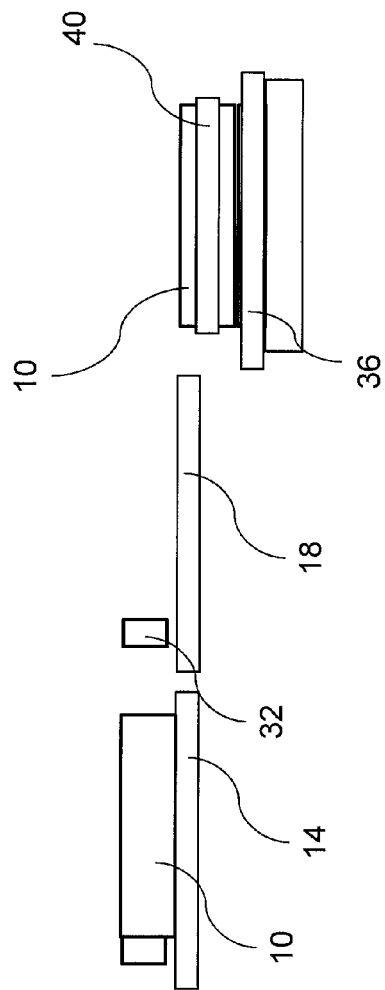

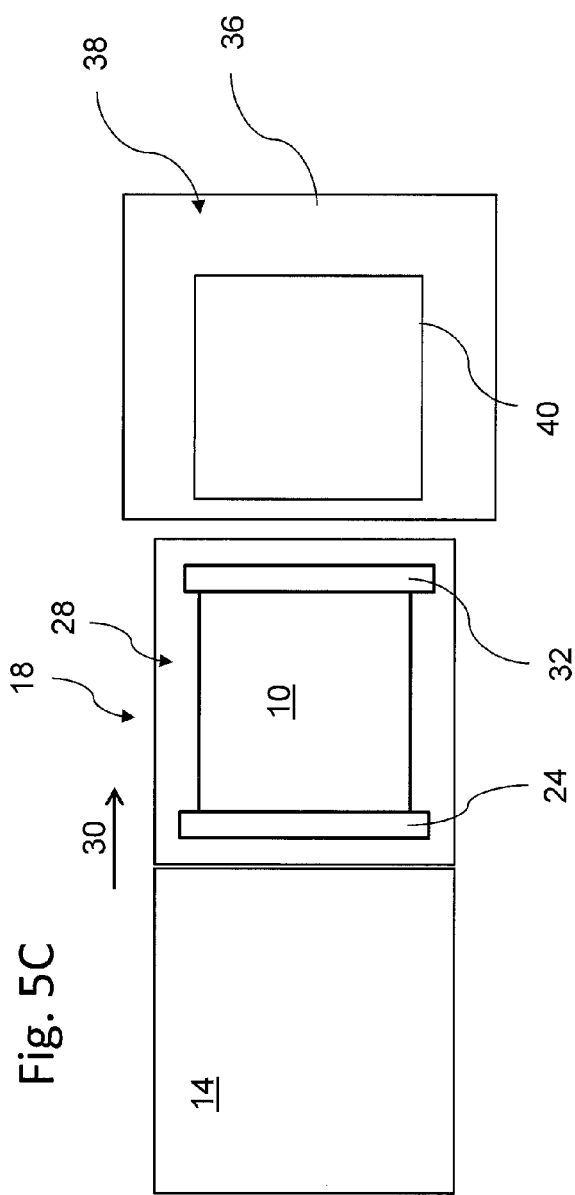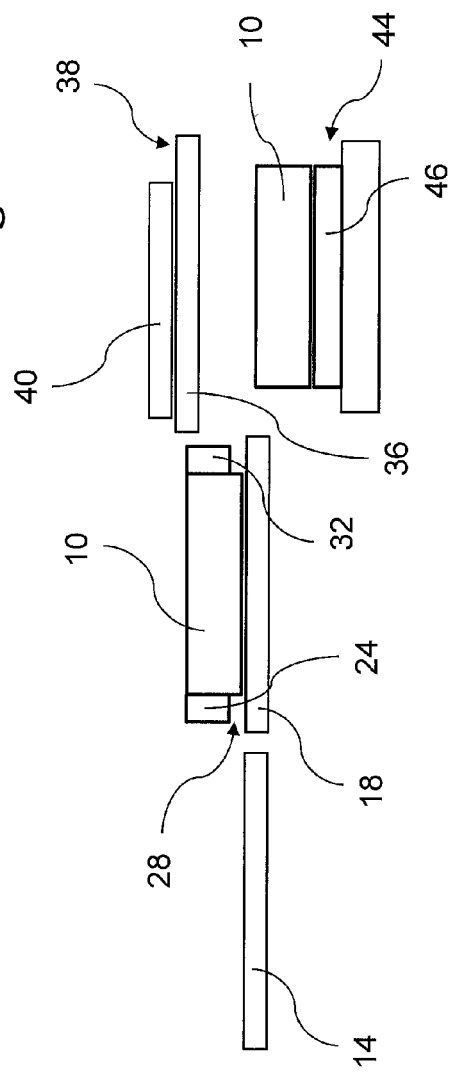

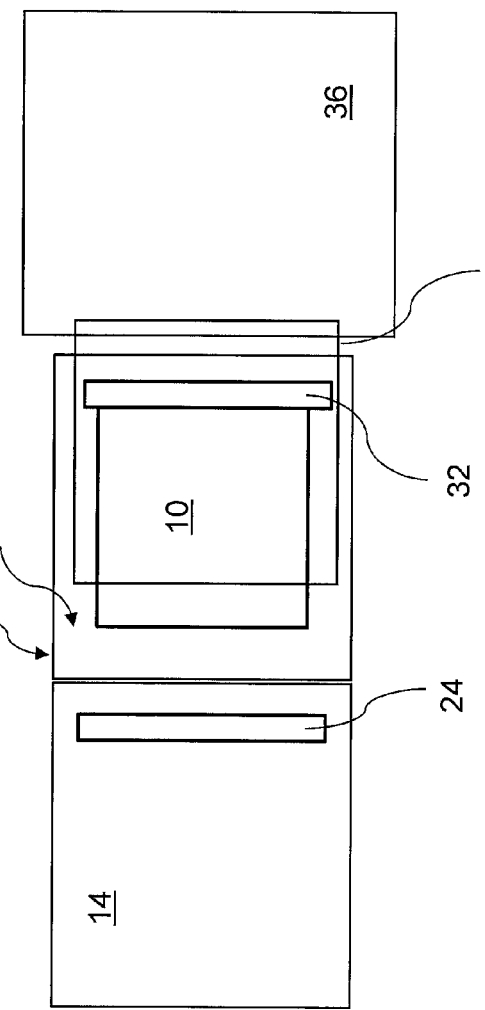
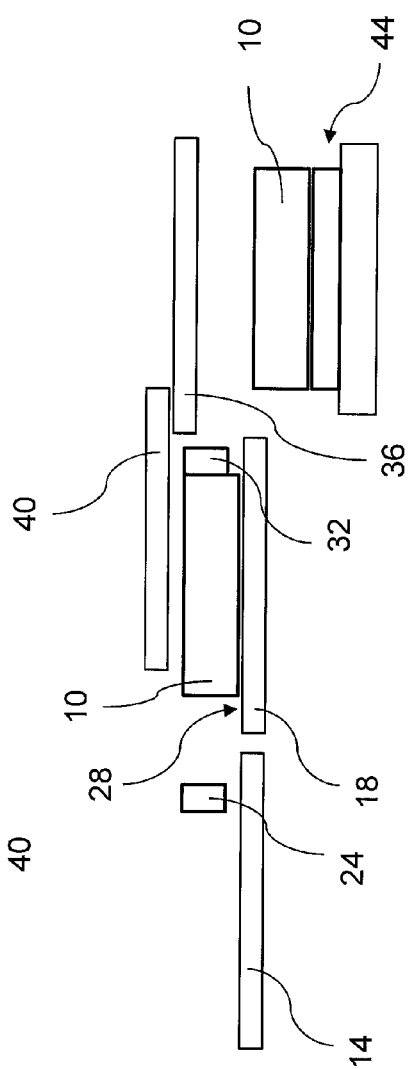
Fig. 6A
Fig. 6B

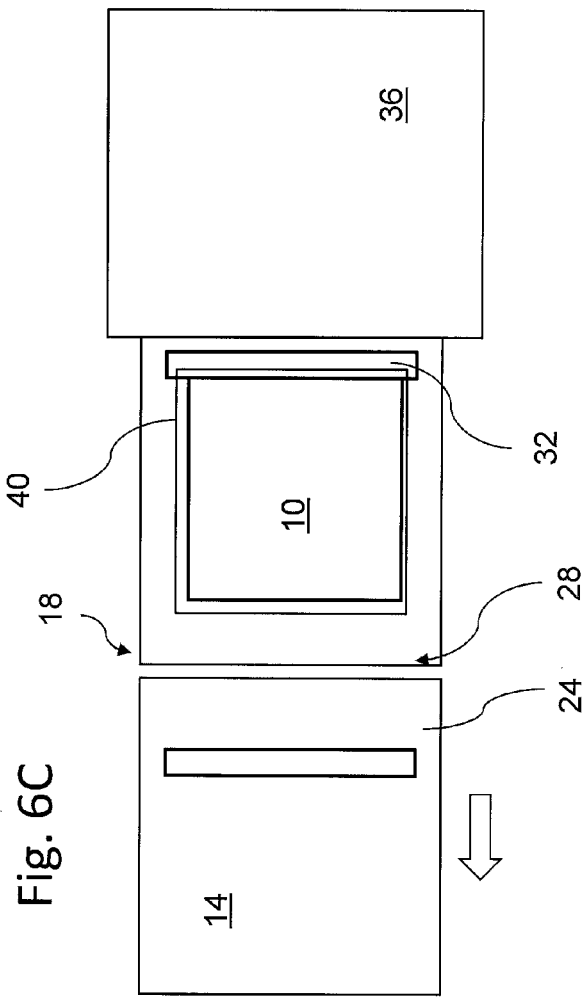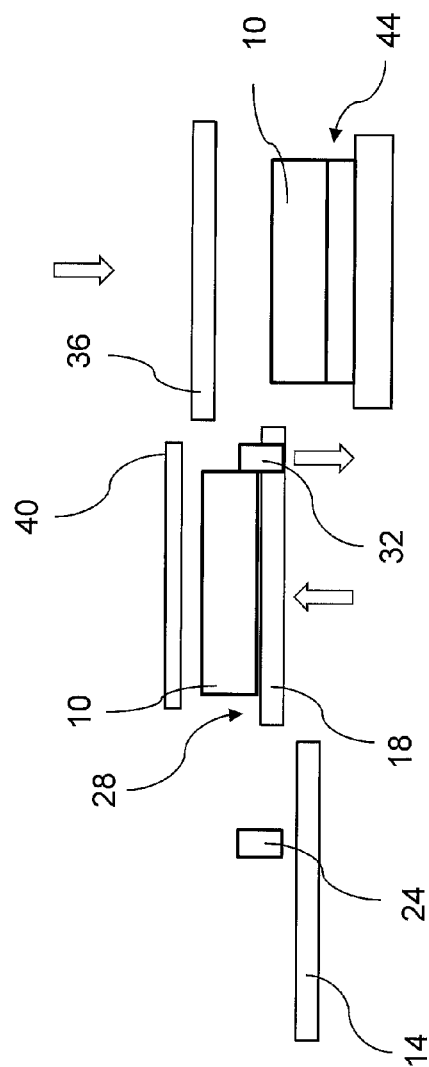

DEVICE AND METHOD FOR HORIZONTAL MOVEMENT OF LAYERS OF ARTICLES BETWEEN ADJACENT CONVEYOR MODULES

FIELD OF THE INVENTION

This invention concerns a method for horizontal movement of groups or layers of articles between adjacent conveyor modules having the characteristics of independent method claim 1. The invention further concerns a related device having the characteristics of independent claim 8.

BACKGROUND OF THE INVENTION

To palletise groups or layers of articles, the articles normally first pass through a grouping station in which the articles initially transported in one or more consecutive rows are moved and/or grouped into palletisable layers. These palletisable layers must be transferred to a suitable loading station capable of carrying out raising movements. The loading station then deposits these layers of articles in a desired place, e.g., a stacking area and a pallet located thereon. The supply and grouping stations may optionally constitute a single unit and/or be directly coupled. The supply and/or grouping station comprise a support surface or level on which the articles are grouped and combined into a layer. The loading station also comprises a support level that may consist of one, two, or more parts. In a support surface of the loading station consisting, e.g., of two parts, the support surface consists of two supports or transfer plates, which are closed when loaded and then subsequently opened during the removal or depositing phase to deposit the layer of articles on a stacking area or pallet. Numerous variants are known to persons skilled in the art, e.g., jalousie gripper heads, etc. Such a palletising method using a prior-art palletising device operates such that, first, articles are grouped into a palletisable layer by means of a grouping device and then transferred from a supply area or supply station to the loading station. To this end, it is necessary for the loading station, e.g., a jalousie gripper head arranged on a hoist element or a robot, to be connected to the supply area so that the layer of articles can be transferred to the loading station. The jalousie gripper head or loading station remains in place until the layer has been completely transferred from the supply station to the loading station. If the layer of articles is completely in the loading station, the loading station positions the layer of articles on a desired transfer point, normally on a pallet provided in a stacking area, by horizontal and vertical movements. Then, the same procedure repeats until the desired number of layers has been placed on the pallet.

DE 10 2008 015 278 A1 discloses a device for loading pallets with piece goods with a piece goods supply station and a transfer device to transfer the group of piece goods from the supply station to a pallet provided on a stacking area and/or a layer of piece goods that has already been transferred to the pallet. EP 1 321 396 A1 discloses another palletising device in which articles are moved laterally and thereby grouped in an unsorted fashion by a horizontal conveyor device before being transferred to a hoisting device in complete layers. The hoisting device or transfer platform serves to compensate for differences in height between the grouping station and the loading station that stacks the layers on top of one another and deposits them on a pallet by opening a retractable floor.

EP 1 908 709 A1 discloses a method and a device for receiving and repositioning bundles. The device has a support for the bundles with an open front side for the insertion of the bundles. A moving slide serves to transfer the bundles in a horizontal receiving direction through the open front side.

A primary objective of this invention is to allow for the movement of complete layers of articles or bundles with short transfer times and the fewest possible malfunctions in stationary and/or vertically movable support levels of consecutive stations of a transport system. In this regard, the articles or bundles in the layers of articles or bundles transferred must maintain their respective spatial alignment relative to one another as exactly as possible.

SUMMARY OF THE INVENTION

This objective is met by a method for horizontal movement of groups or layers of articles from a vertically movable first support level of a first conveyor module to a vertically movable second support level of a second conveyor module immediately downstream of the first conveyor module in the direction of transport. According to the invention, the movement is executed by means of at least one frame-like transfer device, which is pushed over the respective group or layer of articles to be moved from above and encompasses it. After being lowered, the transfer device or frame encompasses the group or layer of articles on all sides, such that it can move it in the direction of transport whilst maintaining the exact configuration of the layer, i.e., the relative spatial arrangement of the individual adjacent articles. During the transfer of a group or layer of articles, the transfer device or frame moves from the first conveyor module to the second. Additionally, at least during the transfer movement, the support levels of the first and second conveyor modules form a common transfer surface at approximately the same height or moving vertically in the same direction.

The transfer device may, in particular, consist of a vertically and horizontally movable transfer frame, which is pushed over a group or layer of articles on the first conveyor module from above, such that it surrounds the group or layer of articles on all sides and can then move them from one conveyor module to the next conveyor module in the direction of transport without the risk of the layer configuration or the relative position of the individual articles moving or otherwise being impaired. After the transfer device or frame has horizontally pushed the group or layer of articles to be transported along the transfer surface to the second conveyor module, it can then be raised above the group or layer of articles from there.

A surface surrounded by the transfer frame advantageously corresponds approximately to the base surface area of a group or layer of articles to be transferred, whereby it may be provided for the size or base surface area of the transfer frame, or the distances between the respective opposite lateral surfaces to be adjustable. If, additionally, the lateral surfaces each expand downward in a funnel configuration, it can be ensured that the transfer frame cannot jam against articles on the edges when applied from above.

In the method according to the invention, a first end position of the transfer frame may be in the area of the first conveyor module in the horizontal direction. Accordingly, a second end position of the transfer frame may be in the area of the second conveyor module in the horizontal direction. Additionally, it may be provided for the vertically movable second conveyor module to be capable of being raised or lowered to deposit a layer or group of articles on the level of a stacking area. It is necessary here for the first and second conveyor module to execute approximately synchronised vertical movements during transfer, because a drop-off would otherwise result that could obstruct the transfer.

A grouping station, in particular a fixed or vertically movable grouping station, may be arranged upstream of the first module. The first module may consist, e.g., of a transfer station that is vertically movable. The second module may consist, e.g., of a loading station can have a hoist element. The transfer frame may be guided on this hoist element of the loading station; preferably, however, it is independent of the loading station, but vertically adjustable above it in all movement states. The transfer frame may thus be suspended on the hoist element and also be horizontally adjustable between the end positions in the area of the conveyor modules to be covered in order to ensure its range of movement.

The invention further comprises a device for handling and/or stacking and/or palletising groups or layers of articles. The device according to the invention comprises a vertically movable first conveyor module with a first support level and a second conveyor module with a second support level immediately downstream of the first conveyor module. Additionally, the invention comprises at least one vertically movable, frame-like transfer device for pushing a group or layer of articles from the first conveyor module to the second, whilst encompassing the transferred group or layer of articles on all sides. At least during the transfer movement, the support levels of the first and second conveyor modules form a common transfer surface at approximately the same height or moving vertically in the same direction. The transfer device of the device may, in particular, consist of a vertically and horizontally movable transfer frame that is pushed over a group or layer of articles on the first conveyor module from above. Optionally, the size of the transfer frame and/or the distances between the respectively opposite lateral surfaces may be adjustable. Additionally, it may be advantageous for the lateral surfaces of the transfer frame to expand downward in a funnel configuration.

In the method according to the invention, the transport of layers of articles within a conveyor line is accelerated in such a manner that the movable support surfaces of the modules need not necessarily come to a stop; instead, an oscillating horizontal movement of one support level of one loading station allows the transfer of a layer of articles to begin earlier than had previously been the case. Additionally, a final portion of the transfer movement may optionally be carried out in the area of the loading station whilst it already induces a vertical hoisting movement to place the transferred layer of articles in a deposit area.

It should be emphasised that, in the following description and the claims, the terms 'supply station', 'loading station', and 'transfer station' are, for simplicity, used interchangeably with the term 'module' or 'conveyor module'. Each of these stations is associated with at least one support surface or level that is suited to receive a layer of articles. Thus, for example, the support level or surface of the loading station may consist of two parts. However, the support levels or surfaces of the supply station and/or transfer station normally consist of one part. Additionally, it would be possible for each of the support surfaces or levels to consist of driven, circulating modular belts, roller conveyors, etc.

To meet the aforementioned objectives, the invention proposes, on the one hand, a method for horizontal movement of groups or layers of articles from a first support surface or level of a first conveyor module to a vertically movable second support surface or level of a second conveyor module immediately downstream of the first conveyor module in a direction of transport. The transfer occurs by means of a suitable transfer frame with which the group or layer of articles can be transferred in the direction of transport between the two support levels of the two conveyor modules, which are nearly aligned at least during the transfer. Because this transfer frame encompasses the groups or articles to be moved on all sides, it is not possible for individual articles to fall over or slip out of the layer. By means of the transfer movements of the groups or layers of articles, e.g., waiting periods of the second conveyor module can be reduced because a raising or lowering movement of the conveyor modules can already begin during the transfer process. This makes it possible to dispense with the waiting period that was previously necessary until the transfer device or a layer slide could be returned to its other end position and removed from the area of collision with the second conveyor module or loading station.

The vertical movement of the second conveyor module or its support level, which can already occur during the final phase of the transfer movement of the layer or group of articles, allows for reduction or minimisation of the necessary time from the transfer of the layers of articles to the deposit of the layers of articles, thus contributing to temporal overlap or synchronicity of individual steps necessary for palletising layers of articles. This temporal and/or procedural overlap of individual steps saves time, thus making a substantial contribution to increased output of the palletising method influenced thereby.

In a variant of the method according to the invention, it is also entirely possible for the first support level of the first conveyor module to be slightly lower or higher at least temporarily or in certain phases than the second support level of the subsequent conveyor module, thus creating a step. In this case, the articles may be pushed upward or downward onto the subsequent, second module, e.g., via a small ramp. This variant allows for the transfer process to begin even earlier, before the support levels are completely aligned, which may also save time for the transfer process, and thus the entire palletising process. Of course, it is also possible for the support levels to be substantially aligned even before contacting the second support level with the transferred articles, and to this end to have reached the same height.

On the other hand, the various variants of the method according to the invention, due to the coordinated movement control for the vertical movement of at least the second support level of the second module downstream of the first conveyor module, allows for the transfer of the group or layer of articles from the first support level of the first module to the second support level of the second module to begin immediately before the formation of the common support level of the first and second support levels, or simultaneously with this phase. Because the foremost articles of a complete layer of articles are normally not on the outermost front edge of the first support level, the transfer movement may already begin in the absence of a common support level. The level need only be formed at least approximately, possibly with a slight step, once the first articles actually cross the boundary between the two support levels and are pushed onto the second support level of the second module.

In the context of this invention, it is also important for the relative positions of a plurality of articles forming the group or layer of articles to be approximately maintained during the aforementioned horizontal movement of the group or layer of articles between the consecutive support levels. Therefore, the movement is executed by means of a suitable transfer device that can move the layer of articles between the two approximately aligned support levels of the two modules. The transfer device consists in particular of a transfer frame movable horizontally in the spatial area of the first and second conveyor modules, which engages the front and back (in the direction of transport) of the layers to be transferred, i.e., the respectively foremost and hindmost articles of the layers.

Additionally, the layers transferred are each contacted with bars of the transfer frame. At least the second conveyor module can be vertically positioned, e.g., with regard to a stack height of layers of articles already deposited on top of one another in a stacking area. The reduced transfer times and the ability to carry out the vertical movements at least of the second conveyor module already during transfer allow for the necessary transport times to be minimised, and contribute to increasing the attainable conveyor speeds.

In order to obtain the at least temporarily coordinated horizontal and vertical movements of the support levels of the first and second modules, it can be useful to permanently record the current vertical and/or horizontal positions of the support levels and of the layers of articles transferred, whereby the values recorded can be processed to calculate an approximation in order to prepare the transfer process. The objective of this position recording and data processing is an optimally coordinated movement of the two support levels of the consecutive modules, thus minimising transfer times.

The first module may consist, e.g., of a transfer unit or a transfer table with a vertically movable support level, whilst the second module may consist of a loading station that also comprises a vertically movable support level. An advantageous control rule may provide for a current vertical position of the loading station or of the second module to dominate the direction of a vertical movement of the transfer unit or of the first support level of the first module in order to bring the two modules or their support levels nearer to one another. Since, in relation to the description of this invention, reference is also made to a grouping system or grouping table upstream of the transfer station, it should be noted that this grouping system or table is described as a third conveyor module when it is upstream of the first conveyor module—the transfer system—in the direction of transport. However, the various numbers or designations of the first, second, and third conveyor modules facilitate an understanding of the related, consecutive steps; the transfer frame moves only between the first and second conveyor modules, but not into the area of the third, upstream conveyor module (the grouping system).

By the action of the transfer frame on all sides, relative positions of a plurality of articles forming the group of articles can be substantially maintained relative to one another, i.e., the configuration of the article group moved remains substantially intact. When articles or layers of articles are referred to in this regard, this may generally refer to widely varied packaged goods, e.g., individual cartons, beverage containers such as bottles, cans, or beverage cartons, piece foods, etc. that can be palletised, stacked, or depalletised in specified configurations. Articles may also include bundles, e.g., film-wrapped or strapped bundles, etc.

Optionally, the device may provide for the first and/or second modules each to be associated with position sensors to detect the current vertical and/or horizontal positions of the first and second support levels, the values of which can be processed in order to calculate an approximation to prepare a transfer process. Using these sensors, the vertical and horizontal positions of the support levels may be determined and coordinated in a control processing the signals of the sensors at any time, such that accelerated transfer movements are possible with simultaneous horizontal movements of the second support level and vertical movement of the second conveyor module supporting the second support level.

The first module may consist, e.g., of a transfer unit or a transfer table, or a grouping station or grouping table, with a fixed or vertically movable first support level, whilst the second module may consist, e.g., of a loading station with a vertically movable second support level. The second module may also consist, e.g., of a lift and/or a jalousie gripper head or another hoist element allowing for height compensation. In the context of this invention, height compensation refers, in particular, to the possibly of stacking during transfer of the layers of articles to one of the modules. Because the layers of articles are generally stacked in multiple layers during palletisation, the height of at least the second conveyor module must be adjustable. This adjustable height includes both the possibility of lowering to transfer the layers of articles on a lower level and the possibility of raising over the level of the first module or the grouping station in order to be able to deposit the layers of articles on top of layers of articles that have already been stacked. This applies accordingly to depalletisation, because a stack of multiple layers of articles to be depalletised gradually becomes smaller, requiring an adjustment of the height of the receiving module, as the removal progresses.

Additionally, it should be noted that the device for transferring layers or groups of articles between the first and second conveyor modules, described in this context as a transfer device or transfer frame, may optionally be augmented with specifically prepared support levels, or by forming them as horizontal conveyor devices, modular belts, etc., by means of which the groups or layers of articles on them can be more easily transferred in the direction of transport to subsequent conveyor or support levels of other conveyor modules. This applies equally to the third conveyor module, the third support level of which may also consist of an appropriate modular belt, etc., in order to facilitate the transfer of the layer of articles to the first conveyor module by means of the transfer device or transfer bar.

BRIEF DESCRIPTION OF THE DRAWINGS

FIG. 2A is a schematic representation of the steps of the transfer of a layer of articles between adjacent vertically movable modules.

FIG. 2B is a schematic representation of the steps of the transfer of a layer of articles between adjacent vertically movable modules.

FIG. 2C is a schematic representation of the steps of the transfer of a layer of articles between adjacent vertically movable modules.

FIG. 2D is a schematic representation of the steps of the transfer of a layer of articles between adjacent vertically movable modules.

FIG. 4A is a schematic representation of the steps of the transfer of a layer of articles between adjacent vertically movable modules.

FIG. 4B is a schematic representation of the steps of the transfer of a layer of articles between adjacent vertically movable modules.

FIG. 4C is a schematic representation of the steps of the transfer of a layer of articles between adjacent vertically movable modules.

FIG. 4D is a schematic representation of the steps of the transfer of a layer of articles between adjacent vertically movable modules.

FIG. 5C is a schematic representation of the steps of the transfer of a layer of articles between adjacent vertically movable modules.

FIG. 5D is a schematic representation of the steps of the transfer of a layer of articles between adjacent vertically movable modules.

FIG. 6A is a schematic representation of the steps of the transfer of a layer of articles between adjacent vertically movable modules.

FIG. 6B is a schematic representation of the steps of the transfer of a layer of articles between adjacent vertically movable modules.

FIG. 6C is a schematic representation of the steps of the transfer of a layer of articles between adjacent vertically movable modules.

FIG. 6D is a schematic representation of the steps of the transfer of a layer of articles between adjacent vertically movable modules.

Figure 1A:
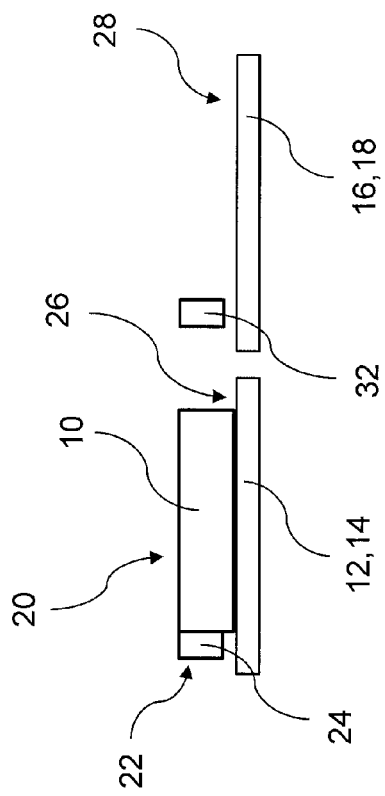
FIG. 1A is a schematic representation of a transfer movement of a layer of articles between adjacent conveyor modules of the present invention.
Figure 1B:
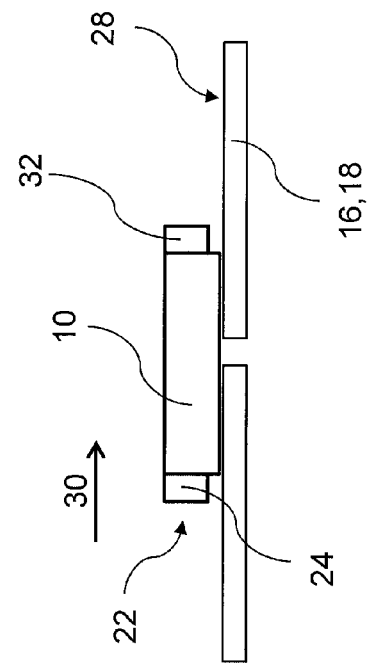
FIG. 1B is a schematic representation of a transfer movement of a layer of articles between adjacent conveyor modules of the present invention.
Figure 1C:
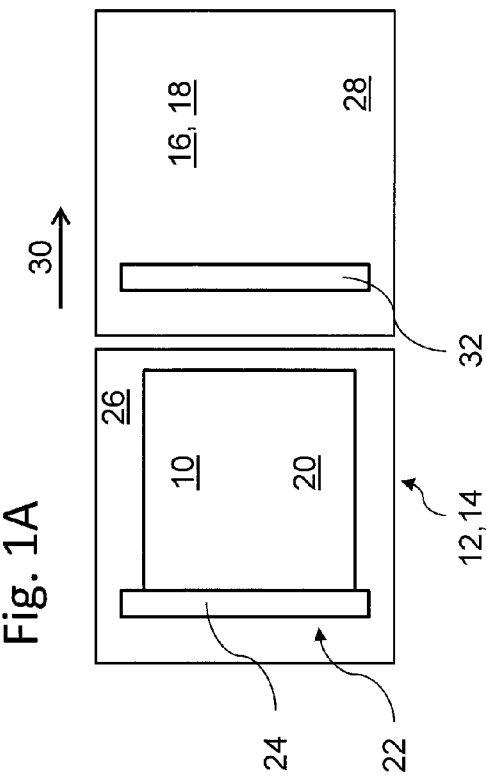
FIG. 1C is a schematic representation of a transfer movement of a layer of articles between adjacent conveyor modules of the present invention.
Figure 1D:
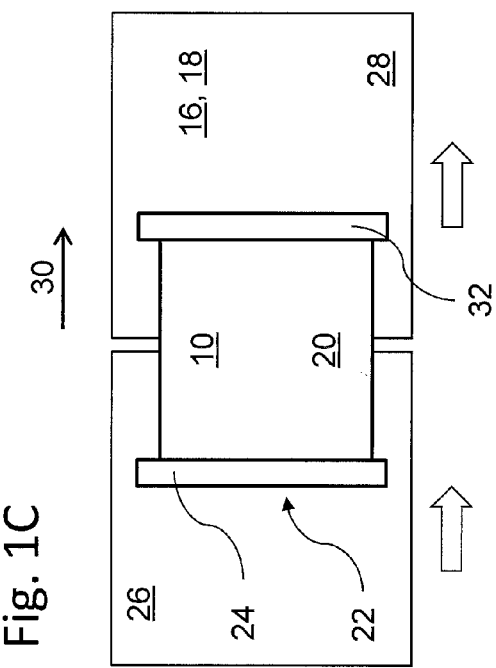
FIG. 1D is a schematic representation of a transfer movement of a layer of articles between adjacent conveyor modules of the present invention.

Exemplary embodiments of the invention and its benefits will be discussed in greater detail below by reference to the attached drawings. The size ratios of the individual elements to one another in the drawings do not always correspond to the actual scale, because some shapes are simplified and others are enlarged relative to other elements for ease of illustration.

DETAILED DESCRIPTION OF THE ILLUSTRATIVE EMBODIMENT

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Illustrative Embodiment") relates to a requirement of the United States Patent Office, and should not be found to limit the subject matter disclosed herein.

FIG. 1 shows a total of eight schematic views of a transfer movement of a layer of articles between adjacent conveyor modules.

FIGS. 2 to 6 show various consecutive schematic views of the steps of the transfer of a layer of articles between adjacent vertically movable modules.

Identical reference numerals are used to designate the same or functionally similar elements of the invention. Additionally, for ease of reference, only reference numerals required for the description of the respective drawing are included in each drawing. The embodiments shown are merely examples of possible configurations of the device or method according to the invention and are in no way intended as limitations thereof.

The total of eight schematic representations (side and top views) of FIG. 1 illustrate the process of the transfer of groups or layers of articles 10 between adjacent conveyor modules, whilst the subsequent FIGS. 2-6 show numerous views of the steps of the transfer of the layer of articles to another conveyor module that is downstream in the direction of transport. Because the representations in FIG. 1 merely serve to provide a better understanding of the method according to the invention, which is described in greater detail in FIGS. 2-6 by reference to an exemplary embodiment, the respective conveyor module on the right is described there as the first conveyor module 16, whilst the respective conveyor module on the left is described as the third conveyor module 12. The further movement of the group or layer of articles 10 using a transfer frame 40 according to the invention, described in greater detail by reference to FIG. 2 et seq., thus goes from the first conveyor module 16 (on the right in FIG. 1, in the middle or left in FIG. 2 et seq.) to the second conveyor module 34 (not shown in FIG. 1, on the right in FIG. 2 et seq.). For this reason, in the following descriptions of FIG. 1A-1H reference is made to a movement of the layer of articles 10 in the direction of transport 30 (to the right) from the third conveyor module 12 to the first conveyor module 16. The logic of this number can be seen from the further description of the transfer movements of the layer of articles 10 from the first conveyor module 16 to the second conveyor module 34 (cf. FIG. 2A-6D).

FIG. 1 shows a schematic top view (FIG. 1A) and a schematic side view (FIG. 1B) of the beginning of a horizontal movement of a group or layer of articles 10 from a starting position from a third module 12, e.g., a grouping table 14 that may be part of a grouping system, into a final position on a first conveyor module 16, which may be a hoisting module, transfer station 18, etc. In the exemplary embodiment shown, the layer of articles 10 comprises a regular arrangement of a plurality of articles 20 in a rectangular configuration, whereby typically no, or minimal, distances are present between the individual articles 20 of the respective layer 10, such that the layer of articles 10 as a whole can be moved substantially without changes in configuration by means of a transfer device 22 in the form of a push bar 24, etc., from a—normally fixed—third support level 26 of the third conveyor module 12 or the grouping table 14 to a first support level 28—normally vertically movable in an upward and downward direction—of the first conveyor module 16 or transfer station 18. The articles 20 may be, e.g., cartons, bundles of several individual articles or containers, or individual containers or other piece goods standing adjacent to one another in a regular configuration.

The push bar 24, responsible for moving the group or layer of articles 10, of the transfer device 22, which is moved at a constant distance parallel to the third support level 26 in the direction of transport or transfer 30, engages the rear of the group of articles 10 in the direction of transport or transfer 30. In other words, it engages the hindmost articles 20 of the group or layer of articles 10, thus moving the entire group or layer of articles 10, which may be guided laterally in order to maintain the configuration; however, this is not shown in FIG. 1A-1H for simplicity and ease of reference. A return movement of the push bar 24 to its initial position, also not shown here, to move another layer of articles 10 from the starting position (FIG. 1A, 1B) may take place optionally at the same height, i.e., just above the third support level 26 of the third conveyor module 12 or grouping table 14. In order to avoid collisions with a subsequent layer of articles 10, the push bar 24 returns to the initial position shown in FIG. 1B advantageously above or below the conveyor level, in particular above the transport level of the articles 20 of the layer 10, whereby two or more push bars 24 of the same type may be driven by means of lateral guides (not shown), such that they carry out endlessly circulating forward and return movements, and can transfer subsequent layers of articles 10 without significant delays in the direction of transfer 30 onto the first conveyor module 16.

Figure 1F:
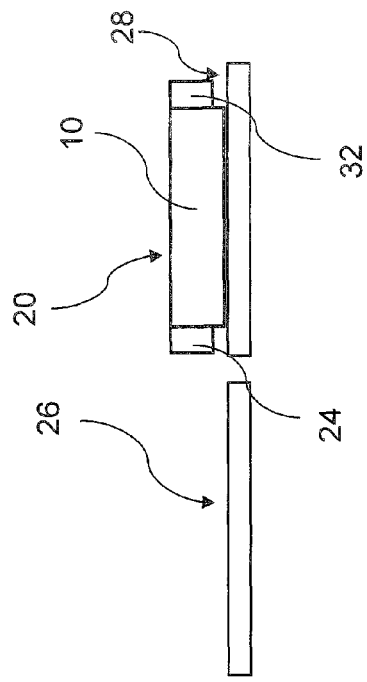
FIG. 1F is a schematic representation of a transfer movement of a layer of articles between adjacent conveyor modules of the present invention.
Figure 1H:
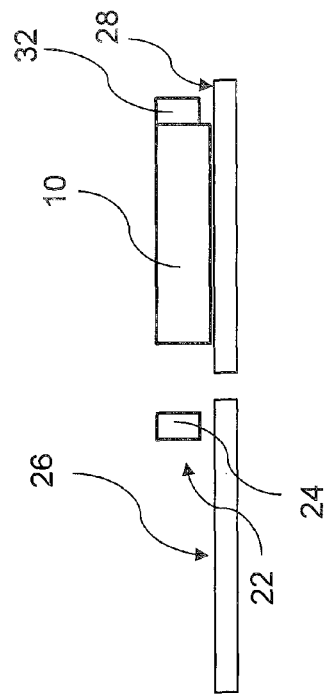
FIG. 1H is a schematic representation of a transfer movement of a layer of articles between adjacent conveyor modules of the present invention.
Figure 1E:
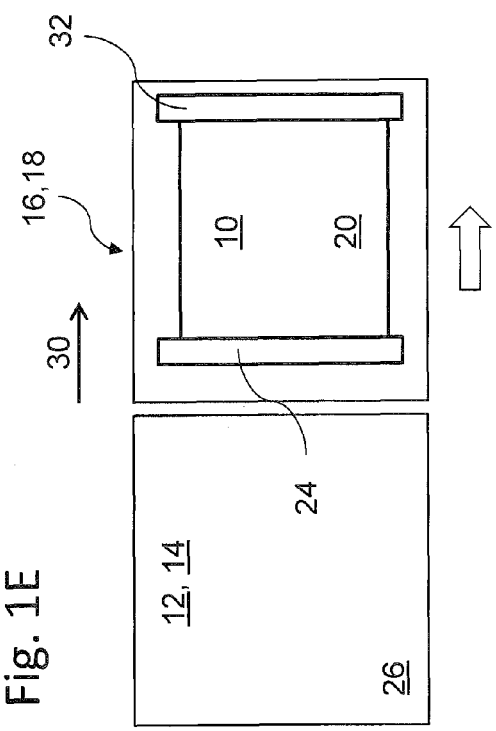
FIG. 1E is a schematic representation of a transfer movement of a layer of articles between adjacent conveyor modules of the present invention.
Figure 1G:
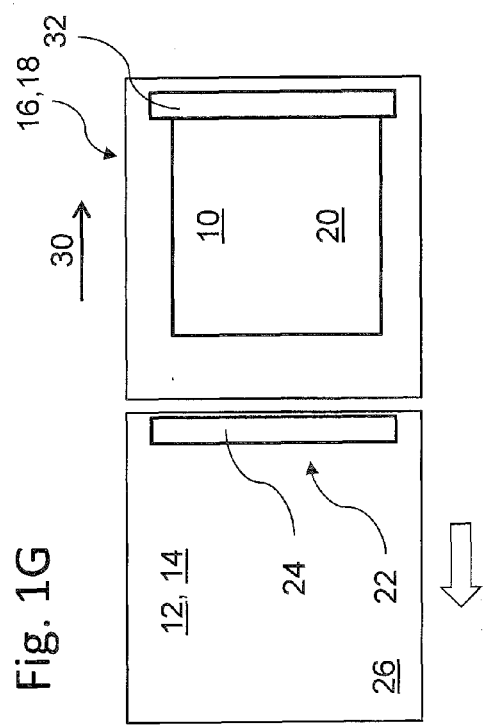
FIG. 1G is a schematic representation of a transfer movement of a layer of articles between adjacent conveyor modules of the present invention.

The first conveyor module 16 or the transfer station 18 is associated with a support bar 32, which can stabilise the layer of articles 10 during transfer to the target position approximately in the middle of the first support level 28 of the first conveyor module 16, as shown in FIGS. 1C, 1D, 1E, and 1F. During the pushing movement in the direction of transport or transfer 30, the push bar 24 engaging on the rear of the layer of articles 10 in the direction of transport 30 moves up to the area of the first conveyor modules 16, as shown in FIGS. 1E and 1F, before returning to the area of the third conveyor module 12 (FIGS. 1G and 1G). As noted, this return movement of the push bar 24 of the transfer device 22 of FIGS. 1G and 1H may occur at the same height or, optionally, above or below the transport height of the layer of articles 10.

By the action of the push bar 24 in the rear of the layer of articles 10 and the frontal action of the support bar 32, the relative positions of a plurality of articles 20 forming the group of articles 10 can be substantially maintained relative to one another, i.e., the configuration of the article group 10 moved remains substantially intact along the forward movement 30. Because the articles 20 of the transferred layer of articles 10 are thus stabilised, the third and first conveyor modules 14, 16 may optionally be raised or lowered during the transfer, whereby these upward and downward movements must be synchronised in order to prevent the formation of a drop between the third support level 26 of the grouping table 14 and the first support level 28 of the transfer station 18, which could destabilise or catch the layer of articles 10. Normally, however, the grouping table 14, which can form the third conveyor module 12, is not vertically movable, because it is normally connected on the left, i.e., against the direction of transport 30, to a horizontal conveyor device for transporting the articles 20, which are transported at a constant height from the horizontal conveyor device (not shown) to the grouping table 14. The transfer station 18, however, which can form the first conveyor module 16, normally has a hoist element that can make it capable of being raised or lowered as soon as the layer of articles 10 has been completely transferred and once the transfer device 22, if any, has been removed from an area of collision with the first conveyor module 16 (cf. FIG. 1G, 1H).

Whilst a second conveyor module directly connected to the first conveyor module 16 is not shown in FIG. 1A-1H for ease of reference, because only the part of the overall transfer process is shown that occurs between the third conveyor module 12 (as it is referred to here) or grouping table 14 and the first conveyor module 16 (as it is referred to here) or transfer station 18, most of the following FIG. 2A-6D show at least the first and second conveyor modules 16, 34 and part of the third conveyor module 12 (arranged to the left of them), to the extent advantageous for precise description of the transfer of the layers of articles 10 between the various conveyor modules and facilitates understanding.

FIGS. 2A and 2B illustrate the rest of the transfer beginning in FIG. 1A-1H for the area of the first and third conveyor modules 16 and 12, in which the layer of articles 10 is transferred from the first conveyor module 16 or transfer station 18 in the direction of transport or transfer 30 to a downstream second conveyor module 34. The second conveyor module 34 may consist, e.g., of a loading station 36, having a second support level 38 to receive the overall layer of articles 10, which is approximately aligned during the transfer with the first support level 28 of the first conveyor module 16.

In the exemplary embodiment shown, both the first conveyor module 16 or transfer station 18 and the second conveyor module 34 or loading station 36 can each be raised and lowered via hoist elements, which can preferably be separately controlled, whereby FIGS. 2A and 2B show a phase of the transfer process in which the hoist element associated with the transfer station 18 ensures that its first support level 28 is raised to the level of the second support level 38 of the loading station 36. The counterbar or support bar 32 associated spatially with the first conveyor module 16 or transfer station 18 is simultaneously lowered below the first support level 28 of the transfer station 18 until the transfer station 18 and loading station 36 approach the level of transfer illustrated in FIGS. 2C and 2D. If there is free space remaining under the loading station 36, the loading station 36 may optionally be lowered, and thus move towards the transfer station 18 that is being simultaneously raised. As can be seen from the schematic side view of FIG. 2B, a transfer frame 40 is above the first support level 28 of the transfer station 18 and above the height of transport of the layer of articles 10 that is movable between the transfer station 18 and the loading station 36, which can be lowered via the layer of articles 10 until it has reached its target position on the first support level 28 of the transfer station 18. In the following context, the transfer frame 40 movable between the first conveyor module 16 and the second conveyor module 34 is also generally referred to as a transfer device 22 (cf. FIG. 2A, 2B), although the more specific description 'transfer frame' 40 will be primarily used below.

Optionally, the transfer frame 40 may be associated with the loading station 36 and thus be connected in its vertical movements with the hoist element of the loading station 36. However, the transfer frame 40 may, depending on the configuration of the overall arrangement, also have its own dedicated hoist element. As shown in FIG. 2B, the transfer frame 40 is on the side of the transfer station 18 and waits there for the layer of articles 10. The centring or lateral guide devices (not shown) of the transfer station 18 must advantageously be arranged lower than the lowest operating position of the transfer frame 40 when it is lowered in the direction of the first support level 28 of the transfer station 18. The slide or push bar 24 associated with the grouping table 14 returns in the direction of the entry position of the bundles or articles 20. The area of the grouping table 14 or grouping system will not be discussed in the following steps because the following concerns transfer from the transfer station 18 to the subsequent loading station 36. The counterbar or support bar 32 of the loading station is positioned behind the layer of articles 10, such that it can ensure that it is exactly positioned and prevent any of the foremost articles falling or slipping, in particular when the layer of articles 10 is transferred at a relatively high speed.

FIGS. 2C and 2D illustrate a subsequent step in which the hoist element of the transfer station 18 has raised it far enough, whilst the hoist element of the loading station 36 has lowered it far enough, that its first and second support levels 28 and 38 form a common transfer level. The counterbar 32 is lowered into the transfer station 18 such that it is below the first support level 28. The transfer frame 40 of the loading station 36 may begin with the transfer of the layer of articles 10 to the loading station 36 and simultaneously centre the position and maintain the respective spatial coordination and positions of the articles 20. Any additional centring means or devices—indicated here by the arrow 42 in FIG. 2C—of the transfer station 18 in the entry position, in turn, are lower than the transfer frame 40 of the loading station 36.

Figure 3B:
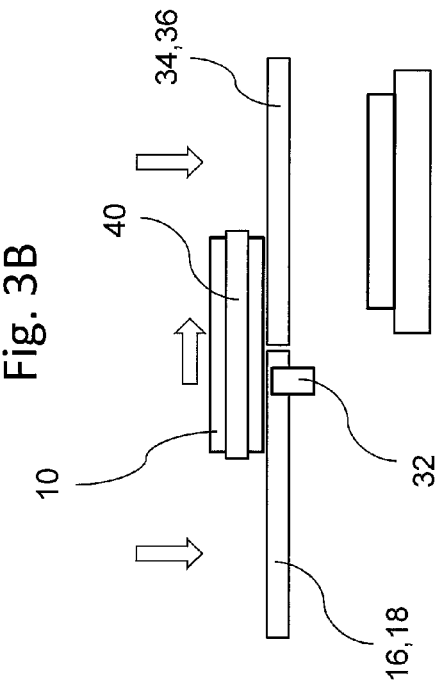
FIG. 3B is a schematic representation of the steps of the transfer of a layer of articles between adjacent vertically movable modules.
Figure 3D:
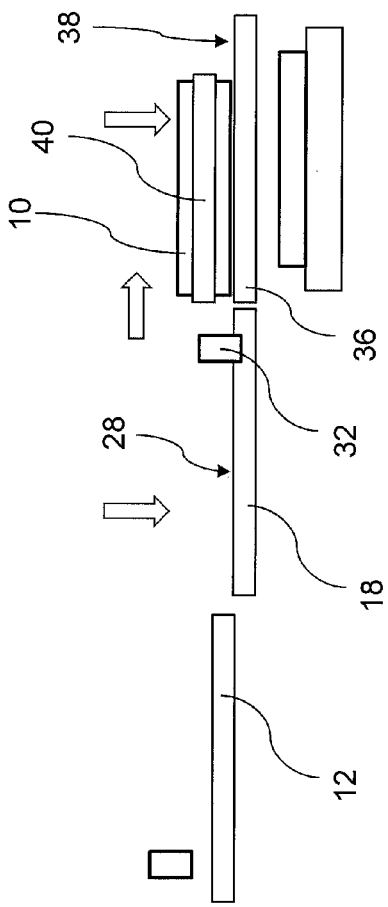
FIG. 3D is a schematic representation of the steps of the transfer of a layer of articles between adjacent vertically movable modules.
Figure 3A:
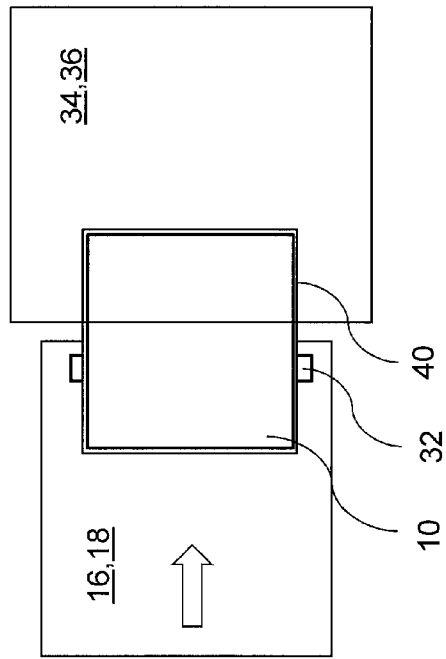
FIG. 3A is a schematic representation of the steps of the transfer of a layer of articles between adjacent vertically movable modules.

The next step, shown in FIGS. 3A and 3B, illustrates the first and second conveyor modules 16 and 34, which consist of the transfer station 18 and the loading station 36 on the same transfer level, which are located at the same height. The two stations 18 and 36 may optionally move jointly and simultaneously in the direction of the removal position. The counterbar 32 is lowered into the transfer station 18. The transfer frame 40 of the loading station 36 moves the layer 10 onto the loading station 36 and simultaneously ensures that the layer 10 remains centred. The centring process (cf. FIG. 2C) may also be simultaneous with the transfer process, because the layer 10 is normally moved before the transfer station 18 is centred when the transfer starts. The centring of the transfer station 18 is lower in the entry position than the transfer frame 40 of the loading station 36.

Figure 3C:
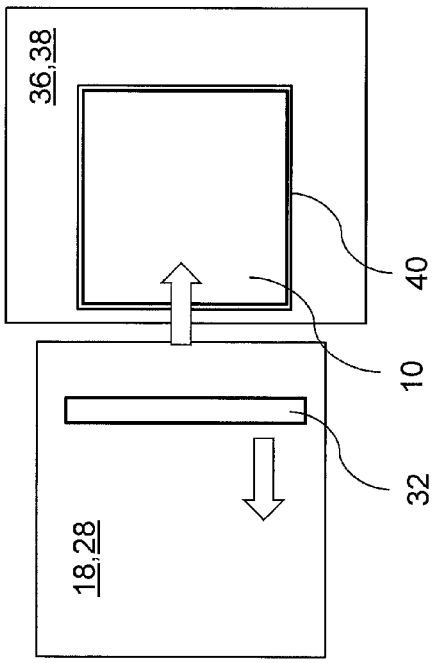
FIG. 3C is a schematic representation of the steps of the transfer of a layer of articles between adjacent vertically movable modules.

The subsequent step, shown in FIGS. 3C and 3D, illustrates the positions of the transfer station 18 and the loading station 36 on the same transfer level. As mentioned, the two stations 18 and 36 may also move together, simultaneously, towards the removal position. The counter bar 32 moves towards the receiving position for the next layer 10, because the already transferred layer 10 has already left the first support level 28 and has thus already passed the counterbar/support bar 32. The transfer frame 40 of the loading station 36 moves the layer 10 onto the loading station 36, and has already left the area of the transfer station 18. In this position, the vertical movements of the transfer station 18 and the loading station 36 can occur independently of one another because no common transfer level is required for the first and second support levels 28 and 38.

FIGS. 4A and 4B are two schematic views (FIG. 4A, top view, FIG. 4B, side view) showing how the transfer station 18 can be raised again in order to return to the height of the grouping system 14. The counterbar/support bar 32 moves towards the receiving position for the next layer, i.e., it is moved against the direction of transport 30 because the layer of articles 10 already transferred (FIG. 3C, 3D) has already passed it. The transfer frame 40 of the loading station 36, along with the layer of articles 10 it contains, reaches the removal position, which is also its target position. When the hoist element has lowered the loading station 36 enough for it to be in the removal position as well, the layer of articles 10 can be deposited on a stacking area 44, which may consist, e.g., of a pallet 46, etc., on which multiple layers of articles 10 can be stacked on top of one another in order to be transported away together (cf. FIG. 4B). The process of depositing the entire layer of articles 10 on the pallet 46 or on top of an article layer 10 already deposited there may normally occur by appropriately configuring a lower support level, in this case the second support level 38 of the second conveyor module 34, formed by the loading station 36. This may consist, e.g., of a jalousie head or plate gripper head, etc., the bottom of which can be opened by pulling apart two halves of the bottom or by moving one side of the bottom in order to deposit the layer of articles 10 already on the bottom and in the loading station 36 in the stacking area 44, or pallet 46.

The following FIGS. 4C and 4D show how the transfer station 18 is returned to its receiving position on the common transfer level with the grouping system 14 in order to receive the next layer of articles 10. For the next layer 10, the counterbar 32 is in the receiving position in the immediate vicinity of the grouping table 14. The transfer frame 40 of the loading station 36 can still be in the removal position already reached with the layer of articles 10.

Figure 5A:
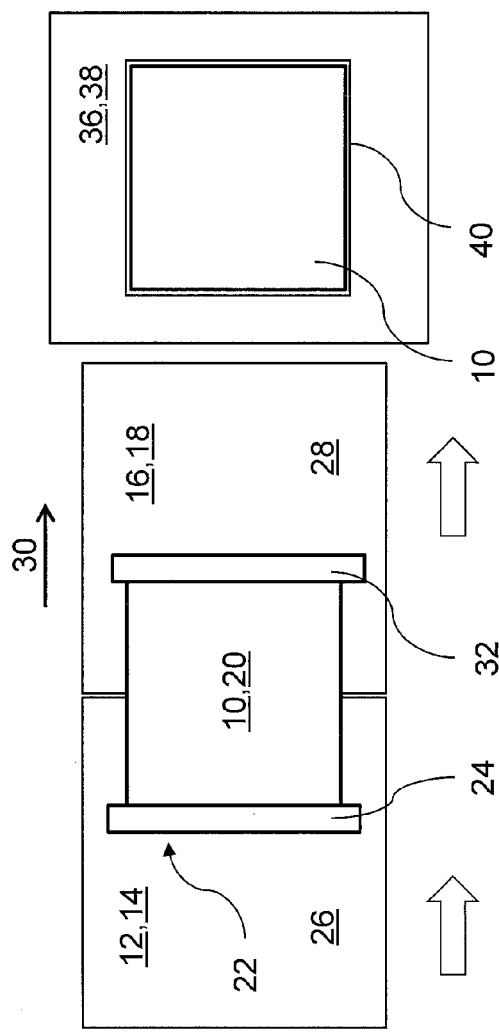
FIG. 5A is a schematic representation of the steps of the transfer of a layer of articles between adjacent vertically movable modules.
Figure 5B:
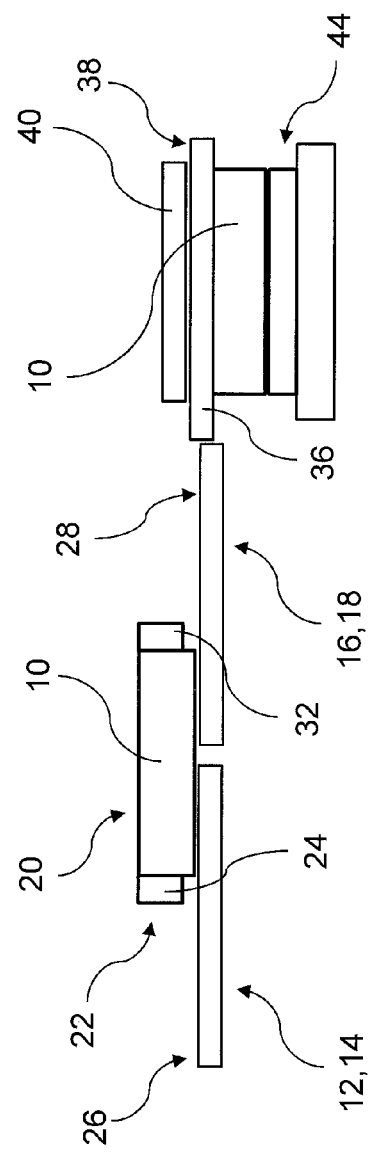
FIG. 5B is a schematic representation of the steps of the transfer of a layer of articles between adjacent vertically movable modules.

FIGS. 5A and 5B illustrate the third and first support levels 26 and 28 of the third and first conveyor modules 12 and 16, formed here by the grouping table 14, which is normally fixed, and the vertically movable transfer station 18. The following layer of articles 10 is transferred by the transfer device 22 from the grouping system 14 to the transfer station 18 by means of the slide 24 of the grouping system 14 being moved to the transfer station 18 in the direction of transport 30. The counterbar 32 of the transfer station 18 works simultaneously as the counterbar of the layer 10, and secures it against falling bundles or articles 20. The slide 24 and the counterbar 32 move at synchronous speed after the synchronisation of the counterbar 32 has been completed. Here, too, the centring of the transfer station 18 is lower in the entry position than the later position of the transfer frame 40 of the loading station 36. The transfer frame 40 of the loading station 36 is still in the removal position with the layer of articles 10 deposited in the stacking area 44. However, due to its bottom, which can preferably be opened or otherwise release the layer of articles 10 or a second support level 38 that can be removed on the side, the loading station 36 has released the layer of articles 10 and can thus be raised over its resting position without further contact with the layer of articles 10 such that the loading station 36 can be raised out of the contact area with the deposited layer of articles 10, as can be seen in FIG. 5B (cf. FIG. 5D).

FIGS. 5C and 5D further illustrate that the transfer station 18 is still on the transfer level of the grouping system 14, although the layer of articles 10 has already been transferred from the grouping system 14 to the transfer station 18 by means of the slide 24. In its final position, the counter bar 32 of the transfer station 18 is on the right edge of the first support level 28, near the loading station 36. The slide 24 of the grouping system 14 has also reached its transfer position. The loading station 36 is raised high enough that the layer 10 previously deposited on the pallet 46 is exposed; the sliding bottom or appropriate device of the second support level 38 can close again. The transfer frame 40 of the loading station 36 moves towards the receiving position on the side of the transfer station 18, indicated as a beginning movement, opposed to the transfer direction 30 in FIG. 5C and FIG. 5D In the illustrations of FIGS. 6A and 6B, the transfer frame 40 has nearly reached the receiving position above the first support level 28. In the illustrations of FIGS. 6A and 6B, the transfer station 18 is still on the transfer level of the grouping system 14. The slide 24 of the grouping system 14, on the other hand, returns, whilst the counterbar 32 of the transfer station 18 is in front of the layer of articles 10 before it is lowered below the level of the first support level 28 (cf. FIG. 6D). The loading station 36 must be raised in order to remain outside of the area of collision with the layers of articles 10 already on the stacking area 44 during the next transfer. The transfer frame 40 of the loading station 36 moves towards the receiving position on the side of the transfer station 18, in order to be lowered to the layer of articles 10 located there once it has reached its corresponding position (cf. FIG. 6C).

FIGS. 6C and 6D finally show a position according to FIGS. 2A and 2B, differing from them in that a layer 10 has already been deposited in the stacking area 44. The hoist element of the transfer station 18 raises it to the level of the loading station 36 in order to transfer the layer of articles 10 on the transfer station 18 to the loading station 36. The counterbar 32 is lowered to the transfer station 18, i.e., below the first support level 28 once the transfer station 18 and the loading station 36 approach the transfer level. If sufficient free space remains under the loading station 36, the loading station 36 may also be moved towards the transfer station 18. The transfer frame 40 of the loading station 36 is on the side of the transfer station 18 and waits for the layer 10 in order to transfer it to the loading station 36. The slide 24 of the grouping system 14 returns to the entry position of the bundles.

The subsequent steps repeat when additional layers of articles 10 are again transferred, as shown.

Finally, it should be noted that the device for transferring layers or groups of articles between the first and second conveyor modules 16, 34, described in this context as a transfer device 22 or transfer frame 40, may optionally be augmented with specifically prepared support levels 28 and 38, e.g., by forming them as horizontal conveyor devices, modular belts, etc., by means of which the groups or layers of articles 10 on them can be more easily transferred in the direction of transport 30 to subsequent conveyor or support levels of other conveyor modules. This applies equally to the third conveyor module 12 (cf. FIG. 1), the support level 26 of which may also consist of an appropriate modular belt, etc., in order to facilitate the transfer of the layer of articles 10 to the first conveyor module 16 by means of the transfer device 22 or transfer bar 24.

The invention was described by reference to a preferred embodiment. However, persons skilled in the art will be aware that variations and modifications of the invention can be made without leaving the scope of the claims below.

REFERENCE NUMERALS

10 Layer or group of articles
12 Third conveyor module
14 Grouping table
16 First conveyor module
18 Transfer station
20 Articles, bundles, containers
22 Transfer device
24 Push bar
26 Third support level (of the third conveyor module)
28 First support level (of the first conveyor module)
30 Feed movement, transfer movement, direction of transport, direction of transfer
32 Support bar, counterbar
34 Second conveyor module
36 Loading station
38 Second support level (of the second conveyor module)
40 Transfer frame
42 Centering device
44 Stacking area
46 Pallet

The invention claimed is:

1. Method for horizontal movement of groups or layers of articles (10), comprising:
   lowering at least one frame-like transfer device (22, 40) over a layer or group of articles (10) positioned on a vertically movable first support level (28) of a first conveyor module (16) such that the frame-like transfer device (22, 40) encompasses the layer or group of articles (10) on all sides;
   vertically moving:
      the first support level (28); and
      a vertically movable second support level (38) of a second conveyor module (34) located immediately downstream of the first conveyor module (16) in the direction of transport or transfer (30),
   such that, at least during a transfer movement of the layer or group of articles (10), the support levels (28, 38) of the first and second conveyor modules (16, 34) form a common transfer surface at approximately the same height; and
   pushing, by the at least one frame-like transfer device (22, 40), the layer or group of articles (10) thereby transferring the layer or group of articles (10) from the first support level (28) to the second support level (38) along the common transfer surface.

2. Method according to claim 1, in which the transfer device (22) comprises a vertically and horizontally movable transfer frame (40) that is pushed over a group or layer of articles (10) on the first conveyor module (16) from above.

3. Method according to claim 1, further comprising:
   wherein the pushing step further comprising horizontally pushing, by the transfer device (22) or frame (40), the group or layer of articles (10) along the transfer surface to the second conveyor module (34); and
   raising the transfer device (22) or frame (40) above the group or layer of articles (10) such that the transfer device (22) or frame (40) no longer encompasses the layer or group of articles (10).

4. Method according to claim 1, in which the size of the transfer frame (40) or the distances between its respectively opposite lateral surfaces are adjustable.

5. Method according to claim 1, in which a first final position of the transfer frame (40) is located horizontally in the area of the first conveyor module (16) and in which a second final position of the transfer frame (40) is located horizontally in the area of the second conveyor module (34).

6. Method according to claim 1, further comprising vertically moving the second conveyor module (34) to the level of a stacking area (44) in order to deposit a layer or group of articles (10).

7. Method according to claim 1, further comprising approximately synchronizing the vertical movements of the first and second conveyor modules (16, 34) during transfer.

8. Device for handling and/or stacking and/or palletising groups or layers of articles (10) comprising:
   a vertically movable first conveyor module (16) with a first support level (28);
   a second conveyor module (34) with a second support level (38) immediately downstream of the first conveyor module (16) in the direction of transport or transfer (30); and
   at least one vertically movable frame-like transfer device (22, 40) for pushing a group or layer of articles (10) from the first conveyor module (16) to the second conveyor module (34), wherein the transfer device (22,40) encompasses the group or layer of articles (10) on all sides;

wherein the support layers (28, 38) of the first and second conveyor modules (16, 34) form a common, vertically moving transfer surface at approximately the same height or moving vertically in the same direction during the transfer (30).

9. Device according to claim 8, in which the transfer device (22) comprises a vertically and horizontally movable transfer frame (40) that is pushed over a group or layer of articles (10) on the first conveyor module (16) from above.

10. Device according to claim 8, in which the size of the transfer frame (40) and/or the distances between its respectively opposite lateral surfaces are adjustable.

11. Device according to claim 8, in which the lateral surfaces of the transfer frame (40) expand downward in a funnel configuration.

12. The method according to claim 6, further comprising:
wherein vertically moving the second conveyor module (34) comprises lowering the second conveyor module (34) to the level of the stacking area (44);
opening the bottom of the second support level (38) such that the layer or group of articles (10) is deposited onto the stacking area (44); and
raising the second conveyor module (34) beyond the deposited layer or group of articles (10).

13. The device according to claim 8, in which a bottom surface of the second support level (38) is configured to open such that the group or layer of articles (10) is deposited upon a stacking area (44).

\* \* \* \* \*